(12) United States Patent
Seol et al.

(10) Patent No.: US 9,319,124 B2
(45) Date of Patent: Apr. 19, 2016

(54) APPARATUS AND METHOD FOR SUPPORTING MULTI-ANTENNA TRANSMISSION IN BEAMFORMED WIRELESS COMMUNICATION SYSTEM

(75) Inventors: Ji-Yun Seol, Seongnam-si (KR); Jeong-Ho Park, Seoul (KR); Hyun-Kyu Yu, Yongin-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 581 days.

(21) Appl. No.: 13/587,739

(22) Filed: Aug. 16, 2012

(65) Prior Publication Data

US 2013/0045690 A1 Feb. 21, 2013

(30) Foreign Application Priority Data

Aug. 16, 2011 (KR) .................. 10-2011-0081150
Aug. 16, 2012 (KR) .................. 10-2012-0089389

(51) Int. Cl.
*H04B 7/26* (2006.01)
*H04B 7/06* (2006.01)
*H04B 7/04* (2006.01)
*H04B 7/08* (2006.01)
*H04L 25/02* (2006.01)

(52) U.S. Cl.
CPC ............ *H04B 7/0628* (2013.01); *H04B 7/0417* (2013.01); *H04B 7/0695* (2013.01); *H04B 7/088* (2013.01); *H04L 25/0206* (2013.01)

(58) Field of Classification Search
CPC ........ H04B 7/00; H04B 7/0417; H04B 7/088; H04L 25/0206

USPC .............. 455/561, 562.1, 575.1, 101, 277.1, 455/277.2; 375/267, 347
See application file for complete search history.

(56) References Cited

U.S. PATENT DOCUMENTS

| 7,483,719 | B2* | 1/2009 | Kim et al. .................. 455/562.1 |
| 7,869,828 | B2* | 1/2011 | Wang et al. ................... 455/561 |
| 8,036,669 | B2 | 10/2011 | Dong et al. |
| 8,170,617 | B2 | 5/2012 | Nassiri-Toussi et al. |

(Continued)

FOREIGN PATENT DOCUMENTS

| KR | 10-2005-0012846 | 2/2005 |
| KR | 10-2005-0120441 | 12/2005 |

(Continued)

OTHER PUBLICATIONS

International Search Report dated Feb. 26, 2013 in connection with International Patent Application No. PCT/KR2012/006535, 3 pages.

(Continued)

*Primary Examiner* — Thanh Le

(57) ABSTRACT

An apparatus and method for supporting diversity in a beamformed wireless communication system. A method for transmitting a signal in a transmit end includes determining Receive (Rx) beamforming capability information of a receive end, receiving channel information on at least one Transmit (Tx) beam pattern from the receive end, determining at least one Tx beam pattern for transmitting a signal to the receive end, in consideration of Rx beamforming support information of the receive end and the channel information on the at least one Tx beam pattern, and transmitting a signal to the receive end using the at least one Tx beam pattern for transmitting the signal to the receive end.

22 Claims, 12 Drawing Sheets

(56) References Cited

U.S. PATENT DOCUMENTS

| | | |
|---|---|---|
| 2004/0121810 A1 | 6/2004 | Goransson et al. |
| 2006/0264184 A1 | 11/2006 | Li et al. |
| 2007/0249402 A1 | 10/2007 | Dong et al. |
| 2008/0043874 A1 | 2/2008 | Lee et al. |
| 2008/0240031 A1 | 10/2008 | Nassiri-Toussi et al. |
| 2009/0232240 A1 | 9/2009 | Lakkis |

FOREIGN PATENT DOCUMENTS

| | | |
|---|---|---|
| KR | 10-2007-0067910 | 6/2007 |
| WO | WO2008/118474 A2 | 10/2008 |

OTHER PUBLICATIONS

Written Opinion of the International Searching Authority dated Feb. 26, 2013 in connection with International Patent Application No. PCT/KR2012/006535, 5 pages.

Extended European Search Report dated Feb. 26, 2015 in connection with European Patent Application No. 12824026.4; 5 pages.

* cited by examiner

APPARATUS AND METHOD FOR SUPPORTING MULTI-ANTENNA TRANSMISSION IN BEAMFORMED WIRELESS COMMUNICATION SYSTEM

CROSS-REFERENCE TO RELATED APPLICATION(S) AND-CLAIM OF PRIORITY

The present application is related to and claims priority under 35 U.S.C. §119(a) to a Korean Patent Application filed in the Korean Intellectual Property Office on Aug. 16, 2011 and assigned Serial No. 10-2011-0081150 and a Korean Patent Application filed in the Korean Intellectual Property Office on Aug. 16, 2012 and assigned Serial No. 10-2012-0089389, the contents of which are herein incorporated by reference.

TECHNICAL FIELD OF THE INVENTION

The present disclosure relates to an apparatus and method for supporting Multi-Antenna Transmission in a wireless communication system. More particularly, the present disclosure relates to an apparatus and method for supporting Multi-Antenna Transmission in a beamformed wireless communication system.

BACKGROUND OF THE INVENTION

Wireless communication systems are being developed to support higher data rates in order to meet a continuously increasing demand for wireless data traffic. For example, for the sake of data rate increase, the wireless communication systems are under technology development to improve spectral efficiency on the basis of a communication technology such as Orthogonal Frequency Division Multiple Access (OFDMA), Multiple Input Multiple Output (MIMO) and the like.

Due to an increase in demand for smart phones and tablet Personal Computers (PCs) and an explosion of application programs requiring a large amount of traffic, there occurs a problem that the demand for data traffic is accelerating while it is difficult to meet the explosive demand for wireless data traffic with only spectral efficiency improvement technology.

As a method for overcoming the aforementioned problem, wireless communication systems using microwave bands are attracting attention.

In supporting wireless communication through microwave bands, there is a problem that a frequency characteristic of the microwave band causes an increase of a propagation loss such as a path loss, a reflection loss and the like. Thus, the wireless communication systems using the microwave bands have a problem that the propagation loss makes a reaching distance of a radio wave short, thus decreasing service coverage.

Thus, by alleviating the path loss of the radio wave using a beamforming technology and increasing a propagation distance of the radio wave, the wireless communication systems using the microwave bands can increase the service coverage.

When using the beamforming technology as above, the wireless communication system can maximize a beamforming gain to optimize a performance index such as a Signal to Noise Ratio (SNR). However, when using the beamforming technology, there is a limitation that, because of a decrease of multipath propagation, the wireless communication system cannot obtain a diversity gain.

SUMMARY OF THE INVENTION

To address the above-discussed deficiencies of the prior art, it is a primary object to provide at least the advantages below.

Accordingly, one aspect of the present disclosure is to provide an apparatus and method for scheduling a Transmit/Receive (Tx/Rx) beam pattern in a wireless communication system using a beamforming technology.

Another aspect of the present disclosure is to provide an apparatus and method for supporting Tx/Rx diversity in a wireless communication system using a beamforming technology.

Another aspect of the present disclosure is to provide an apparatus and method for supporting spatial multiplexing transmission in a wireless communication system using a beamforming technology.

Yet another aspect of the present disclosure is to provide an apparatus and method for estimating and feeding back channel information on a Tx beam pattern of a transmit end in a receive end of a wireless communication system using a beamforming technology.

Yet another aspect of the present disclosure is to provide an apparatus and method for supporting Tx/Rx diversity in consideration of channel information of each beam pattern provided from a receive end in a transmit end of a wireless communication system using a beamforming technology.

Yet another aspect of the present disclosure is to provide an apparatus and method for supporting a spatial multiplexing scheme in consideration of channel information of each beam pattern provided from a receive end in a transmit end of a wireless communication system using a beamforming technology.

Yet another aspect of the present disclosure is to provide an apparatus and method for performing scheduling for Rx beamforming in consideration of Tx beam pattern information of a receive end in a transmit end of a wireless communication system using a beamforming technology.

Yet another aspect of the present disclosure is to provide an apparatus and method for supporting uplink diversity in consideration of Tx beam pattern information of a receive end in a transmit end of a wireless communication system using a beamforming technology.

Yet another aspect of the present disclosure is to provide an apparatus and method for supporting an uplink spatial multiplexing scheme in consideration of Tx beam pattern information of a receive end in a transmit end of a wireless communication system using a beamforming technology.

The above aspects are achieved by providing an apparatus and method for supporting diversity in a beamformed wireless communication system.

According to one aspect of the present disclosure, a method for transmitting a signal in a transmit end of a wireless communication system capable of constructing a plurality of beam patterns is provided. The method includes determining Rx beamforming capability information of a receive end, receiving channel information on at least one Tx beam pattern from the receive end, determining at least one Tx beam pattern for transmitting a signal to the receive end, in consideration of Rx beamforming support information of the receive end and the channel information on the at least one Tx beam pattern, and transmitting a signal to the receive end using the at least one Tx beam pattern for transmitting the signal to the receive end.

According to another aspect of the present disclosure, a method for determining channel information of a beam pattern in a receive end of a wireless communication system capable of constructing a plurality of beam patterns is provided. The method includes transmitting Rx beamforming capability information of the receive end to a transmit end, receiving at least one reference signal that the transmit end has transmitted through each Tx beam pattern, estimating a channel of the each Tx beam pattern using the at least one reference signal, and feeding back channel information of the each Tx beam pattern to the transmit end.

According to a further aspect of the present disclosure, an apparatus in a transmit end of a wireless communication system capable of constructing a plurality of beam patterns is provided. The apparatus includes at least one antenna unit, a receiver, a beam setting unit, and a plurality of Radio Frequency (RF) paths. The at least one antenna unit includes a plurality of antenna elements. The receiver is configured to receive channel information on at least one Tx beam pattern from a receive end. The beam setting unit is configured to determine at least one Tx beam pattern for transmitting a signal to the receive end considering Rx beamforming capability information of the receive end and the channel information on the at least one Tx beam pattern. The plurality of RF paths are configured to connect to the respective antenna elements, and form a beam to transmit a signal to the receive end using the at least one Tx beam pattern determined in the beam setting unit.

According to yet another aspect of the present disclosure, an apparatus in a receive end of a wireless communication system capable of constructing a plurality of beam patterns is provided. The apparatus includes a receiver, a channel estimator, and a feedback controller. The receiver is configured to receive at least one reference signal that a transmit end has transmitted through at least one Tx beam pattern. The channel estimator is configured to estimate a channel of the at least one Tx beam pattern using the at least one reference signal. The feedback controller is configured to transmit Rx beamforming capability information of the receive end to the transmit end, and feedback channel information of the at least one Tx beam pattern to the transmit end.

According to still another aspect of the present disclosure, a method for receiving a signal in a transmit end of a wireless communication system capable of constructing a plurality of beam patterns is provided. The method includes determining Tx beamforming capability information of a receive end, estimating channel information on each Rx beam pattern, determining at least one Rx beam pattern for the receive end to receive a signal considering Tx beamforming support information of the receive end and the channel information on at least one Rx beam pattern, and receiving a signal from the receive end using the at least one Tx beam pattern.

According to still another aspect of the present disclosure, an apparatus in a transmit end of a wireless communication system capable of constructing a plurality of beam patterns is provided. The apparatus includes at least one antenna unit, a channel estimator, a beam setting unit, and a plurality of RF paths. The at least one antenna unit is comprised of a plurality of antenna elements. The channel estimator estimates channel information on at least one Rx beam pattern. The beam setting unit determines at least one Rx beam pattern for receiving a signal from the receive end considering Tx beamforming capability information of a receive end and the channel information on the at least one Rx beam pattern. The plurality of RF paths are connected to each antenna element, and form a beam to receive a signal from the receive end using the at least one Rx beam pattern determined in the beam setting unit.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system. In the following description, well-known functions or constructions are not described in detail since they would obscure the disclosure in unnecessary detail. And, terms described below, which are defined considering functions in the present disclosure, can be different depending on user and operator's intention or practice. Therefore, the terms should be defined on the basis of the disclosure throughout this specification.

Below, exemplary embodiments of the present disclosure provide a technology for supporting Tx/Rx diversity in a beamformed wireless communication system.

In the following description, a transmit end includes any one of a base station, a relay station and a terminal according to a subject for transmitting a downlink signal. Also, a receive end includes any one of a base station receiving a downlink signal from the transmit end, a relay station, and a terminal.

Figure 1:
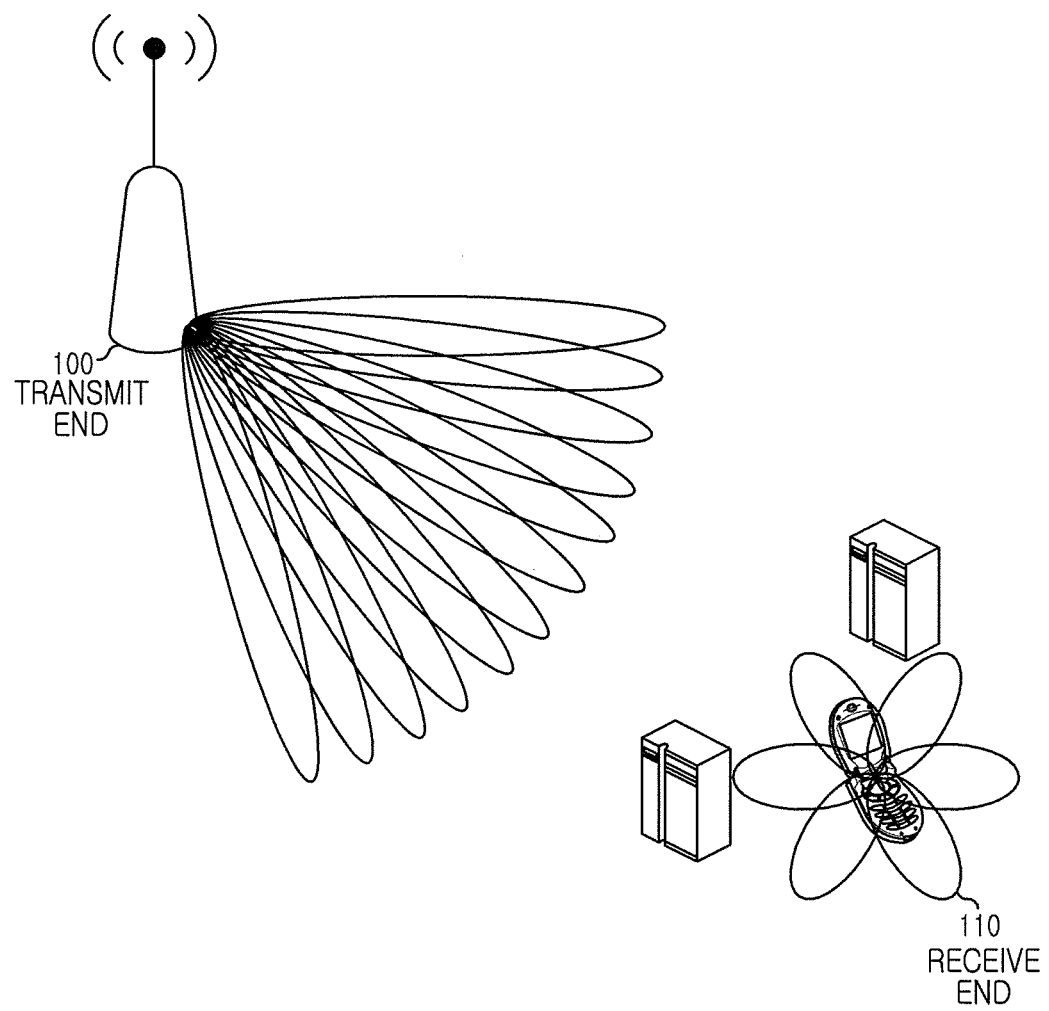
FIG. 1 illustrates a Transmit (Tx) beam of a transmit end and a Receive (Rx) beam of a receive end in a wireless communication system according to the present disclosure.

When using a beamforming technology in a wireless communication system, a transmit end supports a plurality of beam patterns in order to form beams in different directions as illustrated in FIG. 1. Also, a receive end forms Rx beams in all directions or a plurality of different directions through at least one beam pattern as illustrated in FIG. 1.

FIG. 1 illustrates a Tx beam of a transmit end and an Rx beam of a receive end in a wireless communication system according to the present disclosure.

As illustrated in FIG. 1, a transmit end 100 supports a plurality of beam patterns in order to form beams in different directions. The transmit end 100 supports multiple antenna transmission to a receive end 110 using at least one of the plurality of supportable beam patterns. In detail, the transmit end 100 transmits a reference signal to the receive end 110 through each of the plurality of supportable beam patterns. Here, the reference signal represents a signal transmitted through each Tx beam pattern of the transmit end 100 such that the receive end 110 can select a beam for use in transmitting or receiving a signal with the transmit end 100.

The receive end 110 estimates a channel of each Tx beam pattern using the reference signal provided from the transmit end 100. For example, when the receive end 110 does not support Rx beamforming, the receive end 110 estimates a channel of each Tx beam pattern using the reference signal provided from the transmit end 100. For another example, when the receive end 110 supports the Rx beamforming, the receive end 110 estimates a channel of each Tx beam pattern for each Rx beam pattern.

Next, the receive end 110 feeds back channel information of each Tx beam pattern to the transmit end 100. For example, when the receive end 110 supports Rx beamforming, the receive end 110 feeds back channel information of a Tx beam pattern received through each Rx beam pattern, to the transmit end 100.

The transmit end 100 selects at least one beam pattern to be used in a multiple antenna transmission scheme among a plurality of supportable beam patterns using channel information of each Tx beam pattern provided from the receive end 110. Next, the transmit end 100 transmits a signal to the receive end 110 using the at least one beam pattern to be used in the multiple antenna transmission scheme. For example, when the receive end 110 supports Rx beamforming and concurrently can receive a signal using a plurality of Rx beam patterns, the transmit end 100 selects a plurality of Tx beam patterns for the plurality of Rx beam patterns for the sake of diversity transmission. Next, the transmit end 100 transmits the same information to the receive end 110 through the plurality of Tx beam patterns selected for diversity transmission. The transmit end 100 transmits information on the plurality of Rx beam patterns selected for diversity transmission, to the receive end 110 using control information.

As another example, when the receive end 110 supports Rx beamforming but concurrently cannot receive a signal using a plurality of Rx beam patterns, the transmit end 100 may select a plurality of Tx beam patterns for the plurality of Rx beam patterns. After that, the transmit end 100 transmits the same information to the receive end 110 through different Tx beam patterns for the plurality of Rx beam patterns at a different timing. In an embodiment, the transmit end 100 transmits information on the plurality of Rx beam patterns selected for diversity transmission, to the receive end 110 using control information.

As a further example, when the receive end 110 supports Rx beamforming but concurrently cannot receive a signal using a plurality of Rx beam patterns, the transmit end 100 may select one Tx beam pattern for one Rx beam pattern. Next, the transmit end 100 transmits the same information to the receive end 110 through the same Tx beam pattern and Rx beam pattern at a different timing. In an embodiment, the transmit end 100 transmits information on the Rx beam pattern selected for diversity transmission, to the receive end 110 using control information.

As yet another example, when the receive end 110 does not support Rx beamforming, the transmit end 100 may select a plurality of Tx beam patterns. Next, the transmit end 100 transmits the same information to the receive end 110 through the plurality of Tx beam patterns selected for diversity transmission. In an embodiment, the transmit end 100 may transmit the same information to the receive end 110 using a different Tx beam pattern at a different timing.

As still another example, when the receive end 110 does not support Rx beamforming, the transmit end 100 may select one Tx beam pattern.

As still another example, when the receive end 110 supports Rx beamforming and concurrently can receive a signal using a plurality of Rx beam patterns, the transmit end 100 selects a plurality of Tx beam patterns for the plurality of Rx beam patterns for the sake of spatial multiplexing transmission. After that, the transmit end 100 transmits different information to the receive end 110 through the plurality of Tx beam patterns selected for the sake of the spatial multiplexing transmission. In an exemplary embodiment, the transmit end 100 transmits information about the plurality of Rx beam patterns selected for the sake of the spatial multiplexing transmission, to the receive end 110 using control information.

The following description is made for a construction of a transmit end for forming a Tx beam.

Figure 2:
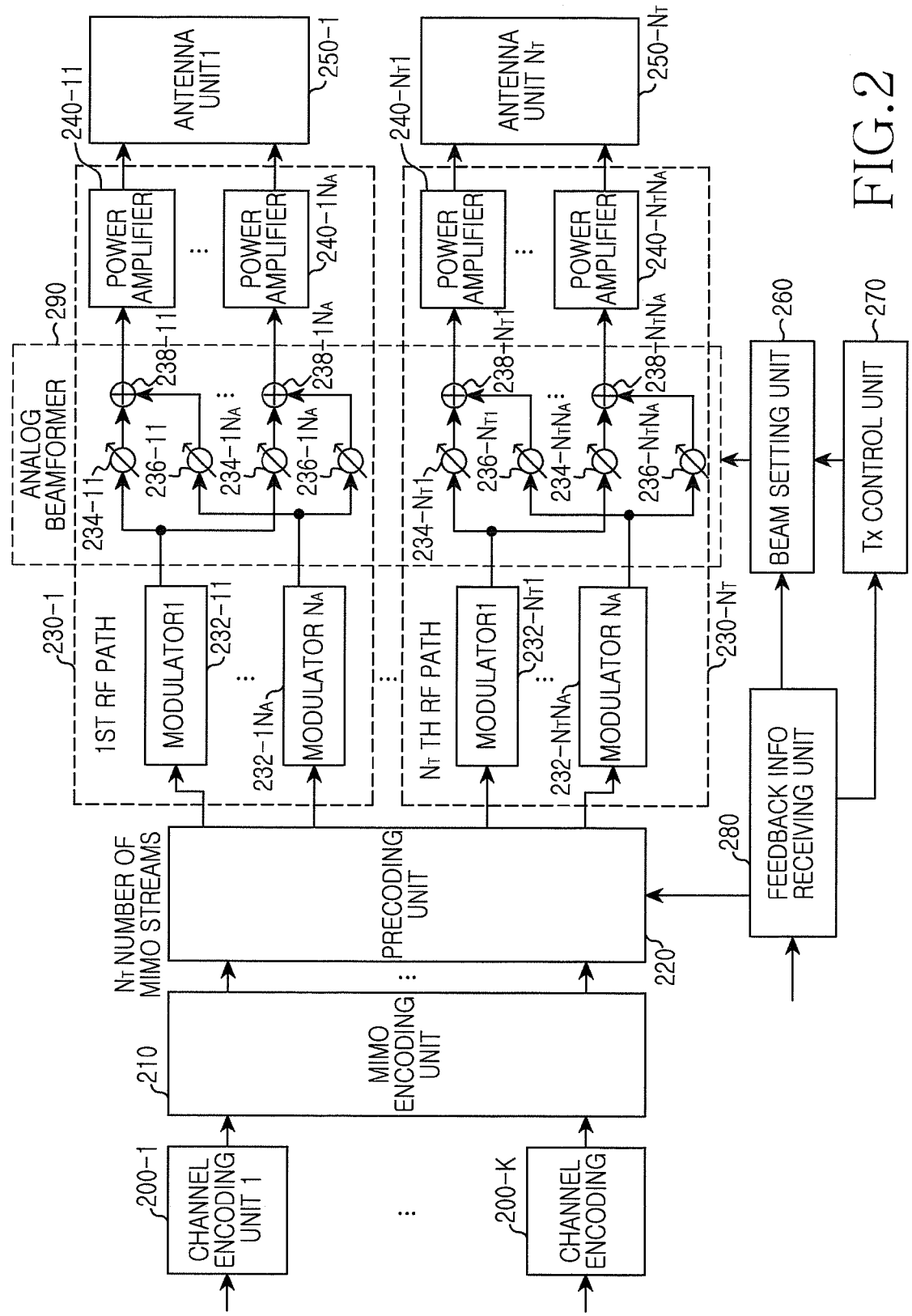
FIG. 2 illustrates a transmit end for forming a Tx beam according to the present disclosure.

FIG. 2 is a block diagram illustrating a transmit end for forming a Tx beam according to the present disclosure. Here, it is assumed that the transmit end applies a digital/analog hybrid beamforming scheme.

As illustrated in FIG. 2, the transmit end includes a 'K' number of channel encoding units 200-1 to 200-K, a MIMO encoding unit 210, a precoding unit 220, an '$N_T$' number of Radio Frequency (RF) paths 230-1 to 230-$N_T$, an '$N_T$' number of antenna units 250-1 to 250-$N_T$, a beam setting unit 260, a Tx control unit 270, and a feedback information receiving unit 280.

The 'K' number of channel encoding units 200-1 to 200-K each include a channel encoder and a modulator, and encode and modulate signals to be transmitted to a receive end.

To transmit signals through the '$N_T$' number of antenna units 250-1 to 250-$N_T$, the MIMO encoding unit 210 multiplexes modulation signals provided from the 'K' number of channel encoding units 200-1 to 200-K into signals to be transmitted through an '$N_T$' number of streams.

The precoding unit 220 precodes an '$N_T$' number of signals provided from the MIMO encoding unit 210 into precodes for digital beamforming, and provides the precodes to the respective RF paths 230-1 to 230-$N_T$.

The '$N_T$' number of RF paths 230-1 to 230-$N_T$ each process to output signals provided from the precoding unit 220 through the corresponding antenna units 250-1 to 250-$N_T$. The '$N_T$' number of RF paths 230-1 to 230-$N_T$ have the same construction. Thus, in the following description, a construction of the first RF path 230-1 is described as representative. The remaining RF paths 230-2 to 230-$N_T$ have the same construction as the first RF path 230-1.

The first RF path 230-1 includes an $N_A$ number of modulators 232-11 to 232-1$N_A$, an analog beamformer 290, and an $N_A$ number of power amplifiers 240-11 to 240-1$N_A$. Here, '$N_A$' represents the number of antenna elements constituting the antenna unit 1 250-1.

The $N_A$ number of modulators 232-11 to 232-1$N_A$ each modulate signals provided from the precoding unit 220 according to a communication scheme. For example, the $N_A$ number of modulators 232-11 to 232-1$N_A$ each include an Inverse Fast Fourier Transform (IFFT) operator and a Digital to Analog Converter (DAC). The IFFT operator converts a signal provided from the precoding unit 220 into a time domain signal through IFFT operation. The DAC converts the time domain signal provided from the IFFT operator into an analog signal.

The analog beamformer 290 shifts phases of an '$N_A$' number of transmit signals provided from the '$N_A$' number of modulators 232-11 to 232-1$N_A$ according to a Tx beam weight provided from the beam setting unit 260. For example, the analog beamformer 290 includes a plurality of phase shifters 234-11 to 234-1$N_A$ and 236-11 to 236-1$N_A$, and combiners 238-11 to 238-1$N_A$. The '$N_A$' number of modulators 232-11 to 232-1$N_A$ each separate an output signal into an '$N_A$' number of signals and output the '$N_A$' number of signals to the respective phase shifters 234-11 to 234-1$N_A$ and 236-11 to 236-1$N_A$. The phase shifters 234-11 to 234-1$N_A$ and 236-11 to 236-1$N_A$ each shift phases of signals provided from the '$N_A$' number of modulators 232-11 to 232-1$N_A$ according to a Tx beam weight provided from the beam setting unit 260. The combiners 238-11 to 238-1$N_A$ combine output signals of the phase shifters 234-11 to 234-1$N_A$ and 236-11 to 236-1$N_A$ corresponding to antenna elements.

The power amplifiers 240-11 to 240-1$N_A$ each amplify power of signals provided from the combiners 238-11 to 238-1$N_A$ and output the signals to the external through the antenna unit 1 250-1.

Figure 8A:
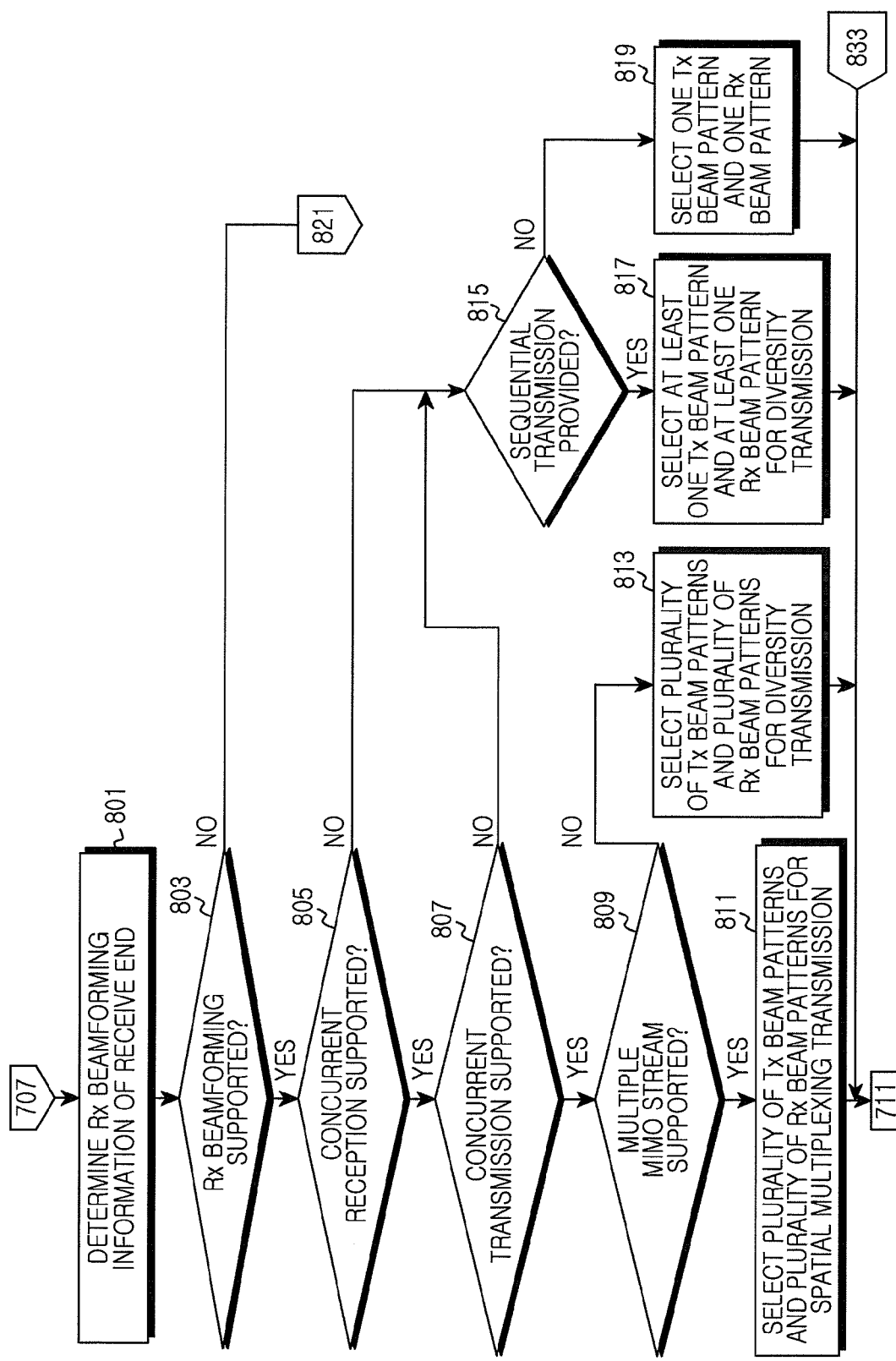
FIGS. 8A and 8B illustrate a scheduling procedure for beamforming in a transmit end according to an embodiment of the present disclosure.
Figure 8B:
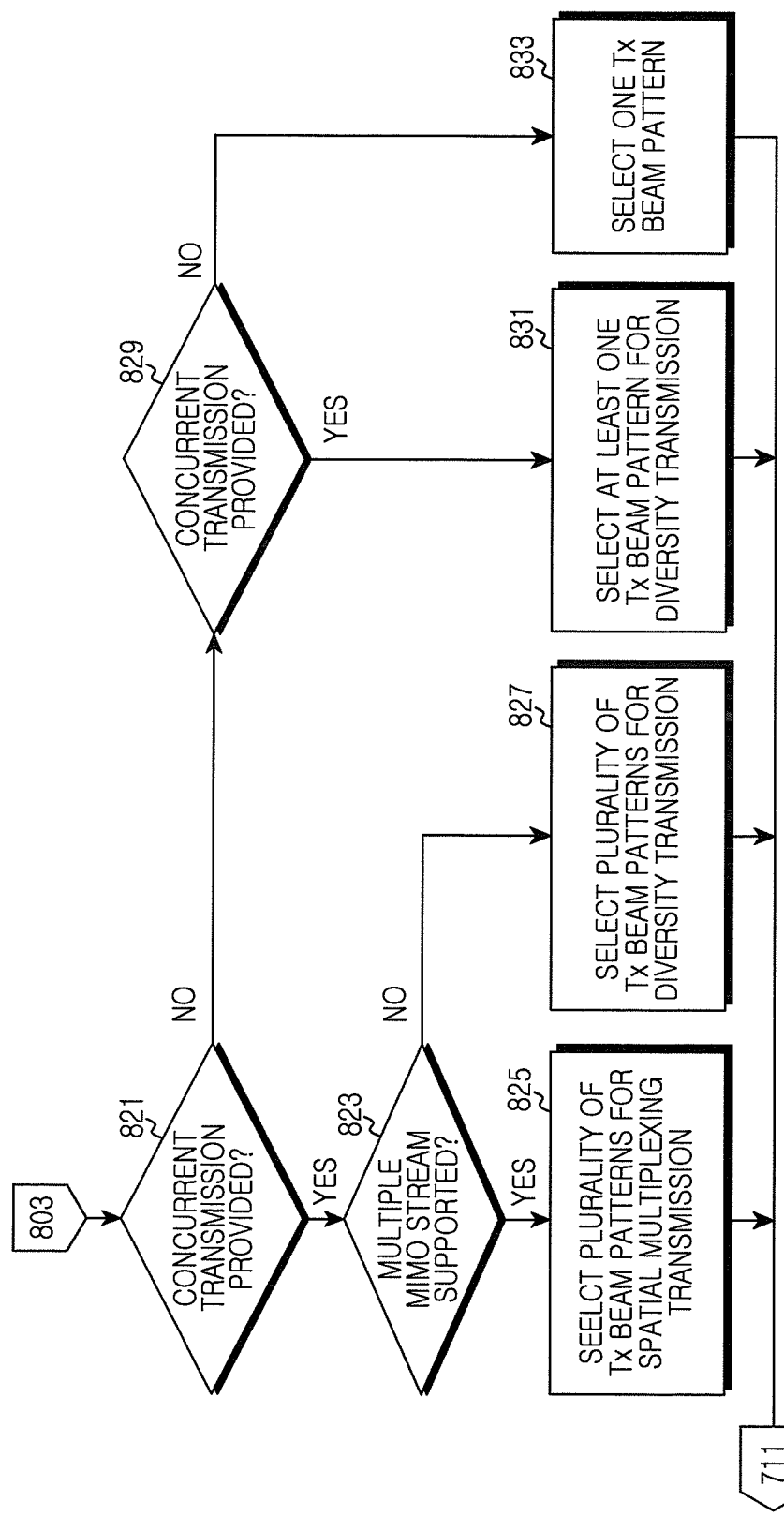

The beam setting unit 260 selects a Tx beam pattern to be used for transmitting a signal according to the control of the Tx control unit 270, and provides a Tx beam weight dependent on the selected Tx beam pattern to the analog beamformer 290. For example, the beam setting unit 260 selects at least one Tx beam pattern to be used for diversity transmission considering channel information on each Tx beam pattern provided from the feedback information receiving unit 280 according to the control of the Tx control unit 270. As another example, the beam setting unit 260 selects at least one Tx beam pattern and at least one Rx beam pattern to be used for diversity transmission considering channel information on each Tx beam pattern provided from the feedback information receiving unit 280 according to the control of the Tx control unit 270. As a further example, the beam setting unit 260 selects a plurality of Tx beam patterns and a plurality of Rx beam patterns to be used in spatial multiplexing transmission considering channel information on each Tx beam pattern provided from the feedback information receiving unit 280 according to the control of the Tx control unit 270. In an embodiment, the beam setting unit 260 selects a Tx beam pattern or Tx/Rx beam pattern for multiple antenna transmission as illustrated in FIGS. 8A and 8B.

The Tx control unit 270 controls the beam setting unit 260 to select a Tx beam pattern for forming a Tx beam. For example, the Tx control unit 270 controls the beam setting unit 260 to be able to transmit a reference signal through each Tx beam pattern supportable by the transmit end. That is, the Tx control unit 270 controls the beam setting unit 260 to select a Tx beam pattern to transmit a reference signal. As another example, the Tx control unit 270 controls the beam setting unit 260 to select a Tx beam pattern or Tx/Rx beam pattern to be used for diversity transmission considering beamforming information of a receive end. As a further example, the Tx control unit 270 controls the beam setting unit 260 to select Tx/Rx beam pattern to be used for spatial multiplexing considering beamforming information of a receive end. Here, the beamforming information of the receive end includes Rx beamforming support or non-support, the number of supportable Rx beam patterns, concurrent usability or non-usability of a plurality of Rx beams, information on the number of concurrently usable Rx beams, the number of usable MIMO streams, and the like.

Also, the Tx control unit 270 controls to send a channel information request to a receive end. For example, the Tx control unit 270 controls to transmit a broadcasting signal for a request for channel information of a Tx beam pattern or a control message (e.g., REP-REQ) for the channel information request. For another example, the Tx control unit 270 sends a channel information request to the receive end by allocating a resource for channel information transmission to the receive end. In an embodiment, the Tx control unit 270 may control to transmit report form information for feeding back channel information to the receive end, together with the channel information request. Here, the report form information includes at least one of the number of Tx beam patterns to feed back channel information, the number of Tx beam patterns and Rx beam patterns to feed back the channel information, the number of Tx beam patterns by Rx beam to feed back the channel information, and a reference value for beam selection and channel information feedback. In an exemplary embodiment, the reference value for beam selection and channel information feedback includes at least one of an absolute value of a channel quality, a relative value of the channel quality for a reference beam combination, a time variance of a beam combination channel quality and a standard deviation of the beam combination channel quality, and a correlation value between beam combinations.

The feedback information receiving unit 280 receives information fed back from a receive end, and outputs the feedback information to the precoding unit 220, the beam setting unit 260, and the Tx control unit 270.

As described above, the Tx control unit 270 controls the beam setting unit 260 to select a Tx beam pattern or Tx/Rx beam pattern to be used for diversity transmission in consideration of beamforming information of the receive end. For example, when the receive end supports Rx beamforming and concurrently can receive a signal using a plurality of Rx beam patterns, the Tx control unit 270 controls the beam setting unit 260 to select a plurality of Tx beam patterns for a plurality of Rx beam patterns. For another example, when the receive end supports Rx beamforming but concurrently cannot receive a signal using a plurality of Rx beam patterns, the Tx control unit 270 controls the beam setting unit 260 to select a plurality of Tx beam patterns for a plurality of Rx beam patterns. As a further example, when the receive end supports Rx beamforming but concurrently cannot receive a signal using a plurality of Rx beam patterns, the Tx control unit 270 controls the beam setting unit 260 to select one Tx beam pattern for one Rx beam pattern. As yet another example, when the receive end does not support Rx beamforming, the Tx control unit 270 controls the beam setting unit 260 to select a plurality of Tx beam patterns. As still another example, when the receive end does not support Rx beamforming, the Tx control unit 270 controls the beam setting unit 260 to select one Tx beam pattern. That is, the Tx control unit 270 controls the beam setting unit 260 to select a Tx beam pattern or Tx/Rx beam pattern for diversity transmission as illustrated in FIGS. 8A and 8B.

Although not illustrated, the transmit end may further include a channel estimator for estimating a channel for an Rx beam pattern.

The following description is made for a construction of a receive end supporting Rx beamforming.

Figure 3:
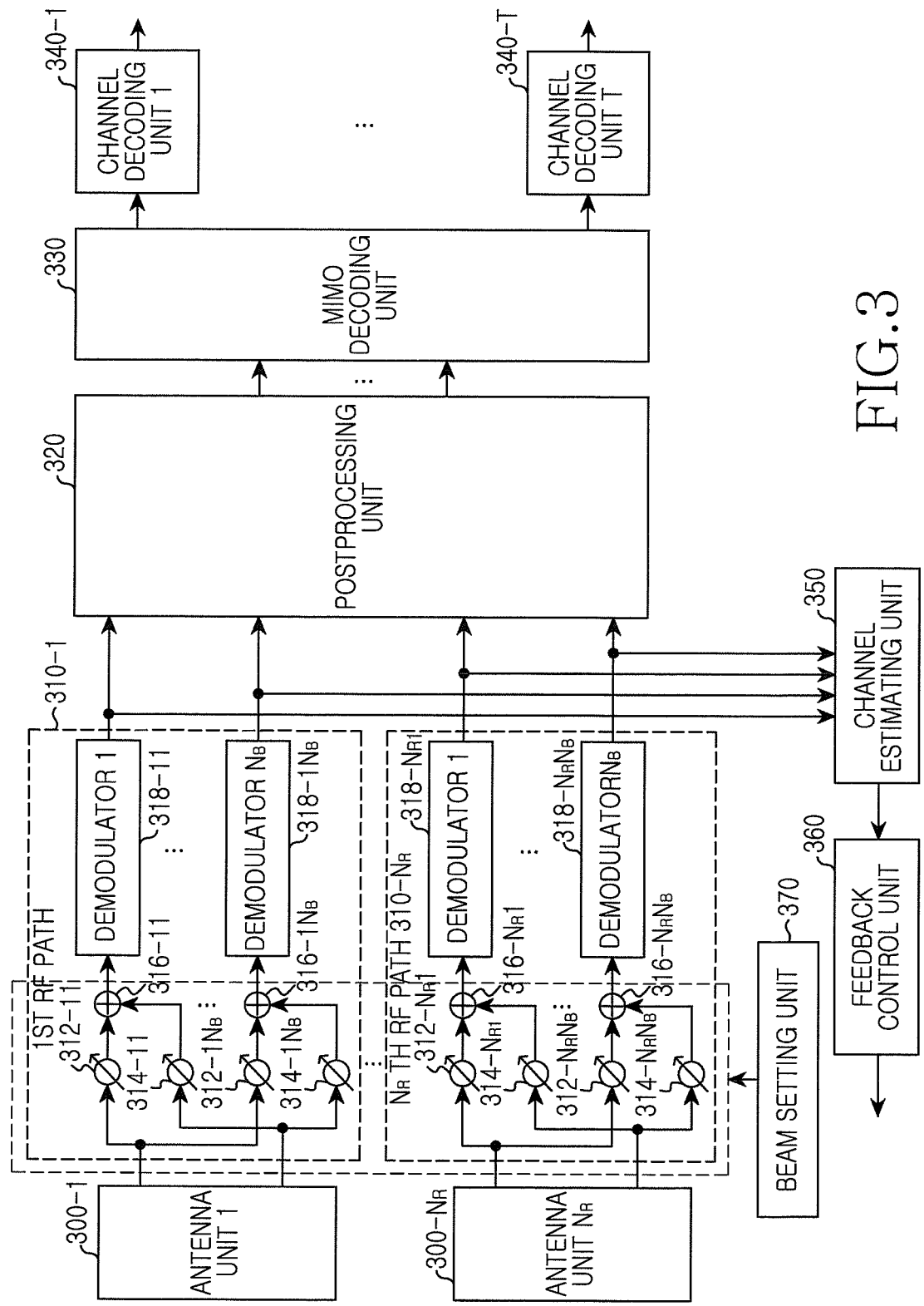
FIG. 3 illustrates a receive end for forming an Rx beam according to the present disclosure.

FIG. 3 is a block diagram illustrating a receive end for forming a Rx beam according to the present disclosure. Here, it is assumed that the receive end applies a digital/analog hybrid beamforming scheme.

As illustrated in FIG. 3, the receive end includes an '$N_R$' number of antenna units 300-1 to 300-$N_R$, an '$N_R$' number of RF paths 310-1 to 310-$N_R$, a postprocessor 320, a MIMO decoding unit 330, a 'T' number of channel decoding units 340-1 to 340-T, a channel estimating unit 350, a feedback control unit 360, and a beam setting unit 370.

The '$N_R$' number of RF paths 310-1 to 310-$N_R$ each process signals received through the corresponding antenna units 300-1 to 300-$N_R$. In an embodiment, the '$N_R$' number of RF paths 310-1 to 310-$N_R$ have the same construction. Thus, in the following description, a construction of the first RF path 310-1 is described as representative. In an embodiment, the remaining RF paths 310-2 to 310-$N_R$ have the same construction as the first RF path 310-1.

The first RF path 310-1 includes an analog beamformer 380 and an '$N_B$' number of modulators 318-11 to 318-1$N_B$. Here, '$N_B$' represents the number of antenna elements constituting the antenna unit 1 300-1.

The analog beamformer 380 shifts phases of an '$N_B$' number of receive signals provided from antenna elements constituting the antenna unit 1 300-1 according to a Tx beam weight provided from the beam setting unit 370. For example, the analog beamformer 380 includes a plurality of phase shifters 312-11 to 312-1$N_B$ and 314-11 to 314-1$N_B$ and combiners 316-11 to 316-1$N_B$. The antenna elements constituting the antenna unit 1 300-1 separate receive signals into an '$N_B$' number of signals and output the signals to the respective phase shifters 312-11 to 312-1$N_B$ and 314-11 to 314-1$N_B$. The respective phase shifters 312-11 to 312-1$N_B$ and 314-11 to 314-1$N_B$ shift phases of signals provided from the antenna elements constituting the antenna unit 1 300-1. The combiners 316-11 to 316-1$N_B$ combine output signals of the phase shifters 312-11 to 312-1$N_B$ and 314-11 to 314-1$N_B$ corresponding to the antenna elements.

The '$N_B$' number of demodulators 318-11 to 318-1$N_B$ each demodulate receive signals provided from the combiners 316-11 to 316-1$N_B$ according to a communication scheme. For example, the '$N_B$' number of demodulators 318-11 to 318-1$N_B$ each include an Analog to Digital Converter (ADC) and a Fast Fourier Transform (FFT) operator. The ADC converts receive signals provided from the combiners 316-11 to 316-1$N_B$ into digital signals The FFT operator converts a signal provided from the ADC into a frequency domain signal through FFT operation.

The postprocessor 320 post decodes signals provided from the '$N_R$' number of RF paths 310-1 to 310-$N_R$ according to a precoding scheme of a transmit end and provides the signals to the MIMO decoding unit 330.

The MIMO decoding unit 330 multiplexes an '$N_R$' number of receive signals provided from the postprocessor 320 into a 'T' number of signals to decode the receive signals in the 'T' number of channel decoding units 340-1 to 340-T.

The 'T' number of channel decoding units 340-1 to 340-T each include a demodulator and a channel decoder, and demodulate and decode signals provided from the transmit end.

Figure 5:
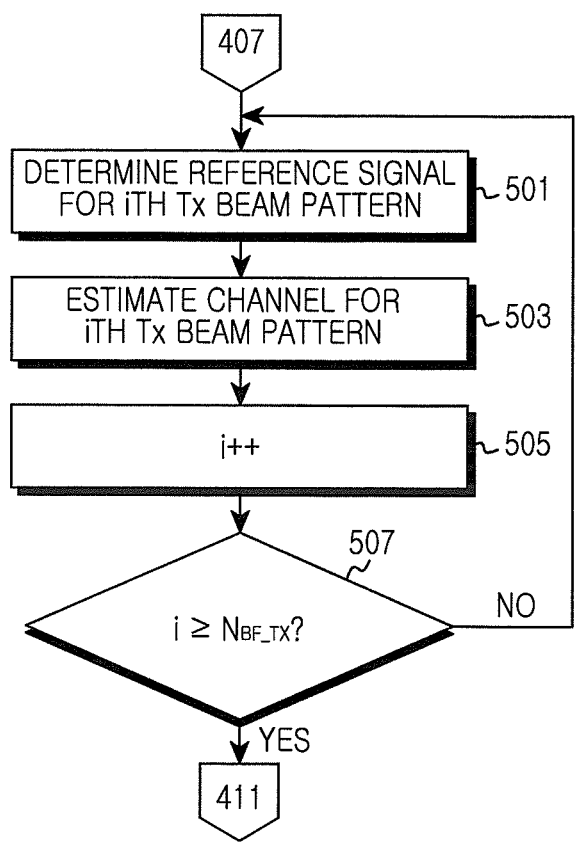
FIG. 5 illustrates a procedure for estimating a channel for a beam pattern in a receive end according to an embodiment of the present disclosure.
Figure 6:
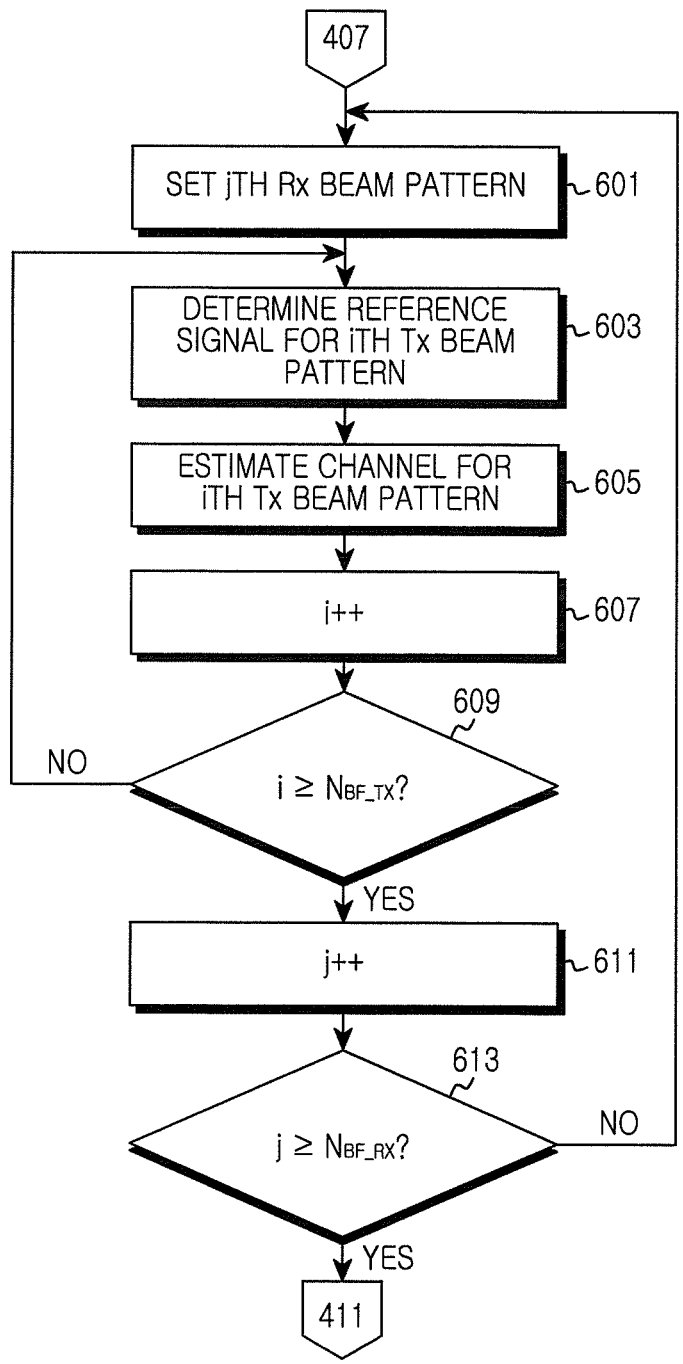
FIG. 6 illustrates a procedure for estimating a channel for a beam pattern in a receive end according to another embodiment of the present disclosure.

The channel estimating unit 350 estimates channel information on each Tx beam pattern by means of a reference signal that the transmit end transmits through each Tx beam pattern. For example, when the receive end supports Rx beamforming, the channel estimating unit 350 estimates channel information on a Tx beam pattern by each supportable Rx beam pattern as illustrated in FIG. 6. For another example, when the receive end does not support Rx beamforming, the channel estimating unit 350 estimates channel information on a Tx beam pattern as illustrated in FIG. 5. In an embodiment, when the transmit end requests for channel information, the channel estimating unit 350 estimates channel information on each Tx beam pattern. Here, the channel information includes at least one of a Signal to Noise Ratio (SNR), a Carrier power Interference and Noise power Ratio (CINR) and a Receive Signal Strength Indicator (RSSI).

The feedback control unit 360 feeds back channel information on each Tx beam pattern estimated in the channel estimating unit 350, to the transmit end. In an embodiment, the feedback control unit 360 feeds back channel information on each Tx beam pattern to the transmit end according to report from information provided from the transmit end. Here, the report form information includes at least one of the number of Tx beam patterns to feed back channel information, the number of Tx beam patterns and Rx beam patterns to feed back the channel information, the number of Tx beam patterns by Rx beam to feed back the channel information, and a reference value for beam selection and channel information feedback. In an exemplary embodiment, the reference value for beam selection and channel information feedback includes at least one of an absolute value of a channel quality, a relative value of the channel quality for a reference beam combination, a time variance of a beam combination channel quality and a standard deviation of the beam combination channel quality, and a correlation value between beam combinations. For example, the feedback control unit 360 feeds back channel information on an 'M' number of Tx beam patterns of good channel states according to the report form information. For another example, the feedback control unit 360 can feed back channel information on a 'P' number of Tx beam patterns of channel states greater than or equal to a reference value according to the report form information. As a further example, when the receive end supports Rx beamforming, the feedback control unit 360 may feed back channel information on an 'N' number of Tx beam patterns of good channel states by Rx beam pattern according to the report form information. As yet another example, when the receive end supports Rx beamforming, the feedback control unit 360 may feed back channel information on a 'T' number of Tx beam patterns of channel states greater than a reference value by Rx beam pattern according to the report form information. As still another example, the feedback control unit 360 may feed back channel information on a Tx beam pattern of the best channel state and at least one Tx beam pattern of a channel state included within a constant range according to the report form information. As still another example, when the receive end supports Rx beamforming, the feedback control unit 360 may feed back channel information on a Tx beam pattern of the best channel state by Rx beam pattern and at least one Tx beam pattern of a channel state included within a constant range according to the report form information. Here, the 'M', 'N', and 'T' denote integers representing the number of Tx beam patterns for feeding back.

Further, the feedback control unit 360 transmits Rx beamforming capability information to the transmit end. For example, the feedback control unit 360 transmits its own Rx beamforming capability information to the transmit end in a capability negotiation process with the transmit end. Here, the capability negotiation with the transmit end can occur at the time of initial network entry and network re-entry.

The beam setting unit 370 provides an Rx beam weight to the analog beamformer 380 such that the receive end receives a signal according to an Rx beam pattern corresponding to a Tx beam pattern selected by the transmit end among a plurality of supportable Rx beam patterns. In an embodiment, the beam setting unit 370 determines an Rx beam pattern to be used for receiving a signal, in a control signal provided from the transmit end.

In the aforementioned embodiment, a receive end transmits Rx beamforming capability information to a transmit end using a feedback control unit.

In another embodiment, the receive end may further include a transmitter for transmitting Rx beamforming capability information to the transmit end.

The following description is made for a method for feeding back channel information on a Tx beam pattern in a receive end.

Figure 4:
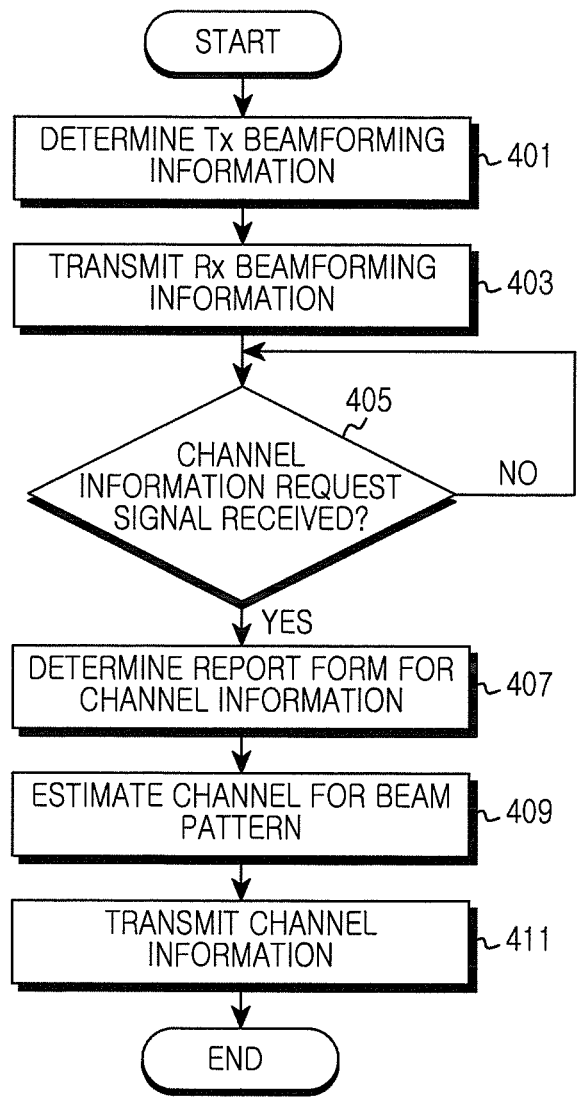
FIG. 4 illustrates a procedure for feeding back channel information on a beam pattern in a receive end according to an embodiment of the present disclosure.

FIG. 4 illustrates a procedure for feeding back channel information on a beam pattern in a receive end according to an embodiment of the present disclosure.

Referring to FIG. 4, in step 401, the receive end determines Tx beamforming information of a transmit end. For example, the receive end receives the Tx beamforming information from the transmit end. Here, the Tx beamforming information includes the number of Tx beam patterns supportable by the transmit end, Tx beam transmission timing and the like.

After that, the receive end proceeds to step 403 and transmits its own Rx beamforming capability information to the transmit end. For example, upon network entry or handover, the receive end transmits its own Rx beamforming capability information to the transmit end in a capability negotiation process with the transmit end. Here, the Rx beamforming capability information includes Rx beamforming support or non-support, the number of supportable Rx beam patterns, concurrent usability or non-usability of a plurality of Rx beams, information on the number of concurrently usable Rx beams, the number of usable MIMO streams and the like. In an embodiment, the receive end can construct the Rx beamforming capability information as in Table 1 below.

TABLE 1

| Capability to support Rx Beamforming | 0b0: non-support |
| --- | --- |
| | 0b1: support |
| Max number of Rx Beamforming patterns | 0b00: 1~0b111: 8 patterns |
| Capability of MIMO support | 0b0: non-support |
| | 0b1: support |
| Max number of MIMO streams | 0b000: 1 stream~0b111: 8 streams |
| Capability of receiving concurrently with different Rx Beamforming patterns | 0b0: non-support |
| | 0b1: support |
| Number of Rx Beamforming patterns supported simultaneously (Number of MS RX Chains) | 0b00: 1~0b11: 4 |

Here, the number of Rx beams concurrently usable in the receive end may be expressed as the number of Rx RF chains of the receive end.

Next, the receive end proceeds to step 405 and determines if the transmit end requests for channel information on each Tx beam pattern. For example, the receive end determines if a broadcasting signal for a channel information request or a control message (e.g., REP-REQ) for the channel information request is received from the transmit end. For another example, the receive end determines if the transmit end allocates a resource for channel information transmission. In an embodiment, when the transmit end allocates the resource for channel information transmission, the receive end recognizes that the transmit end requests for channel information.

When the transmit end requests for channel information on a Tx beam pattern, the receive end proceeds to step 407 and determines a report form for transmitting the channel information. For example, the receive end receives report form information from the transmit end. Here, the report form information includes at least one of the number of Tx beam patterns to feed back channel information, the number of Tx beam patterns and Rx beam patterns to feed back the channel information, the number of Tx beam patterns by Rx beam to feed back the channel information, and a reference value for beam selection and channel information feedback. In an exemplary embodiment, the reference value for beam selection and channel information feedback includes at least one of an absolute value of a channel quality, a relative value of the channel quality for a reference beam combination, a time variance of a beam combination channel quality and a standard deviation of the beam combination channel quality, and a correlation value between beam combinations.

After determining the report form, the receive end proceeds to step 409 and estimates a channel for each supportable Tx beam pattern of the transmit end. For example, the receive end estimates a channel for each Tx beam pattern using a reference signal that the transmit end transmits through each beam pattern. When the receive end supports Rx beamforming, the receive end estimates channel information on a Tx beam pattern of the transmit end by each Rx beam pattern supportable by the receive end as illustrated in FIG. 6. Alternatively, when the receive end does not support Rx beamforming, the receive end estimates channel information on a Tx beam pattern as illustrated in FIG. 5.

After estimating the channel for the Tx bean pattern, the receive end proceeds to step 411 and feeds back the channel information on the Tx beam pattern to the transmit end according to the report form determined in step 407. For example, the receive end feeds back channel information on an 'M' number of Tx beam patterns of good channel states according to the report form information. As another example, the receive end feeds back channel information on a 'P' number of Tx beam patterns of channel states greater than a reference value according to the report form information. As a further example, when the receive end supports Rx beamforming, the receive end feeds back channel information on an 'M' number of Tx beam patterns of good channel states by Rx beam pattern according to the report form information. As yet another example, when the receive end supports Rx beamforming, the receive end feeds back channel information on a 'P' number of Tx beam patterns of channel states greater than a reference value by Rx beam pattern according to the report form information. As still another example, the receive end may feed back channel information on a Tx beam pattern of the best channel state and at least one Tx beam pattern of a channel state included within a constant range according to the report form information. As still another example, when the receive end supports Rx beamforming, the receive end may feed back channel information on a Tx beam pattern of the best channel state by Rx beam pattern and at least one Tx beam pattern of a channel state included within a constant range according to the report form information. Here, the 'M', 'N', and 'T' denote integers representing the number of Tx beam patterns for feeding back. Here, the channel state includes at least one of a CINR, a Received Signal Strength Indication (RSSI), and channel correlation between beam patterns.

Next, the receive end terminates the algorithm according to the embodiment of the present disclosure.

In the aforementioned embodiment, a receive end feeds back channel information on a Tx beam pattern according to a report form provided from a transmit end.

In another embodiment, the receive end may feed back channel information on Tx beam patterns measured by itself to the transmit end without considering a report form of the transmit end.

The following description is made for a method for estimating a channel for a Tx beam pattern in a receive end not supporting Rx beamforming.

FIG. 5 illustrates a procedure for estimating a channel for a beam pattern in a receive end according to an embodiment of the present disclosure.

Referring to FIG. 5, when the receive end estimates a channel of a Tx beam pattern in step 409 of FIG. 4, in step 501, the receive end determines a reference signal for an ith Tx beam pattern. For example, the receive end receives the reference signal that the transmit end transmits through the ith Tx beam pattern. Here, the 'i' is an index of a Tx beam pattern through which the transmit end transmits the reference signal, and has an initial value of '0'.

After determining the reference signal of the ith Tx beam pattern in step 501, the receive end proceeds to step 503 and estimates a channel for the ith Tx beam pattern using the reference signal of the ith Tx beam pattern.

Next, the receive end proceeds to step 505 and updates the index (i) of the Tx beam pattern. For example, the receive end increases the index (i) of the Tx beam pattern by one level (i++).

After updating the index (i) of the Tx beam pattern in step 505, the receive end proceeds to step 507 and compares the updated index (i) of the Tx beam pattern with the number ($N_{BF\_TX}$) of Tx beam patterns supportable by the transmit end, determining if it has estimated channels for all Tx beam patterns supportable by the transmit end.

When the updated index (i) of the Tx beam pattern is less than the number ($N_{BF\_TX}$) of Tx beam patterns supportable by the transmit end (i<$N_{BF\_TX}$), the receive end recognizes that it has not estimated the channels for all Tx beam patterns supportable by the transmit end. Accordingly, the receive end returns to step 501 and determines a reference signal for the ith Tx beam pattern. Here, the index (i) of the Tx beam pattern has a value updated in step 505.

Alternatively, when the updated index (i) of the Tx beam pattern is greater than or equal to the number ($N_{BF\_TX}$) of Tx beam patterns supportable by the transmit end (i≥$N_{BF\_TX}$), the receive end recognizes that it has estimated the channels for all Tx beam patterns supportable by the transmit end. Accordingly, the receive end proceeds to step 411 of FIG. 4 and feeds back channel information on the Tx beam pattern to the transmit end.

The following description is made for a method for estimating a channel for a Tx beam pattern in a receive end supporting Rx beamforming.

FIG. 6 illustrates a procedure for estimating a channel for a beam pattern in a receive end according to another embodiment of the present disclosure.

Referring to FIG. 6, when the receive end estimates a channel of a Tx beam pattern in step 409 of FIG. 4, in step 601, the receive end sets an Rx beam for receiving a signal to a jth Rx beam pattern. Here, the T is an index of an Rx beam pattern supportable by the receive end, and has an initial value of '0'.

After that, the receive end proceeds to step 603 and determines a reference signal for an ith Tx beam pattern. For example, the receive end receives the reference signal that the transmit end transmits through the ith Tx beam pattern. Here, the 'i' is an index of a Tx beam pattern through which the transmit end transmits the reference signal, and has an initial value of '0'.

After determining the reference signal of the ith Tx beam pattern in step 603, the receive end proceeds to step 605 and estimates a channel for the ith Tx beam pattern received through the jth Rx beam pattern using the reference signal of the ith Tx beam pattern.

Next, the receive end proceeds to step 607 and updates the index (i) of the Tx beam pattern. For example, the receive end increases the index (i) of the Tx beam pattern by one level (i++).

After updating the index (i) of the Tx beam pattern in step 607, the receive end proceeds to step 609 and compares the updated index (i) of the Tx beam pattern with the number ($N_{BF\_TX}$) of Tx beam patterns supportable by the transmit end, determining if it has estimated channels for all Tx beam patterns supportable by the transmit end.

When the updated index (i) of the Tx beam pattern is less than the number ($N_{BF\_TX}$) of Tx beam patterns supportable by the transmit end (i<$N_{BF\_TX}$), the receive end recognizes that it has not estimated the channels for all Tx beam patterns supportable by the transmit end. Accordingly, the receive end returns to step 603 and determines a reference signal for the ith Tx beam pattern. Here, the index (i) of the Tx beam pattern has a value updated in step 607.

Alternatively, when the updated index (i) of the Tx beam pattern is greater than or equal to the number ($N_{BF\_TX}$) of Tx beam patterns supportable by the transmit end (i ≥$N_{BF\_TX}$), the receive end recognizes that it has estimated the channels for all Tx beam patterns supportable by the transmit end. Accordingly, the receive end proceeds to step 611 and updates the index (j) of the Rx beam pattern. For instance, the receive end increases the index (j) of the Rx beam pattern by one level (j++).

After updating the index (j) of the Rx beam pattern, the receive end proceeds to step 613 and compares the updated index (j) of the Rx beam pattern with the number ($N_{BF\_RX}$) of Rx beam patterns supportable by the receive end, determining if it has estimated channels of Tx beam patterns for all Rx beam patterns supportable by the receive end.

When the updated index (j) of the Rx beam pattern is less than the number ($N_{BF\_RX}$) of Rx beam patterns supportable by the receive end (j<$N_{BF\_RX}$), the receive end recognizes that it has not estimated channels of Tx beam patterns for all Rx beam patterns supportable by the receive end. Accordingly, the receive end returns to step 601 and sets an Rx beam for receiving a signal to a jth Rx beam pattern. Here, the index (j) of the Rx beam pattern has a value updated in step 611.

Alternatively, when the updated index (j) of the Rx beam pattern is greater than or equal to the number ($N_{BF\_RX}$) of Rx beam patterns supportable by the receive end (j ≥$N_{BF\_RX}$), the receive end recognizes that it has estimated channels of Tx beam patterns for all Rx beam patterns supportable by the receive end. Accordingly, the receive end proceeds to step 411 of FIG. 4 and feeds back channel information of the Tx beam pattern for the Rx beam pattern to the transmit end.

The following description is made for a method for supporting diversity transmission in a transmit end.

Figure 7:
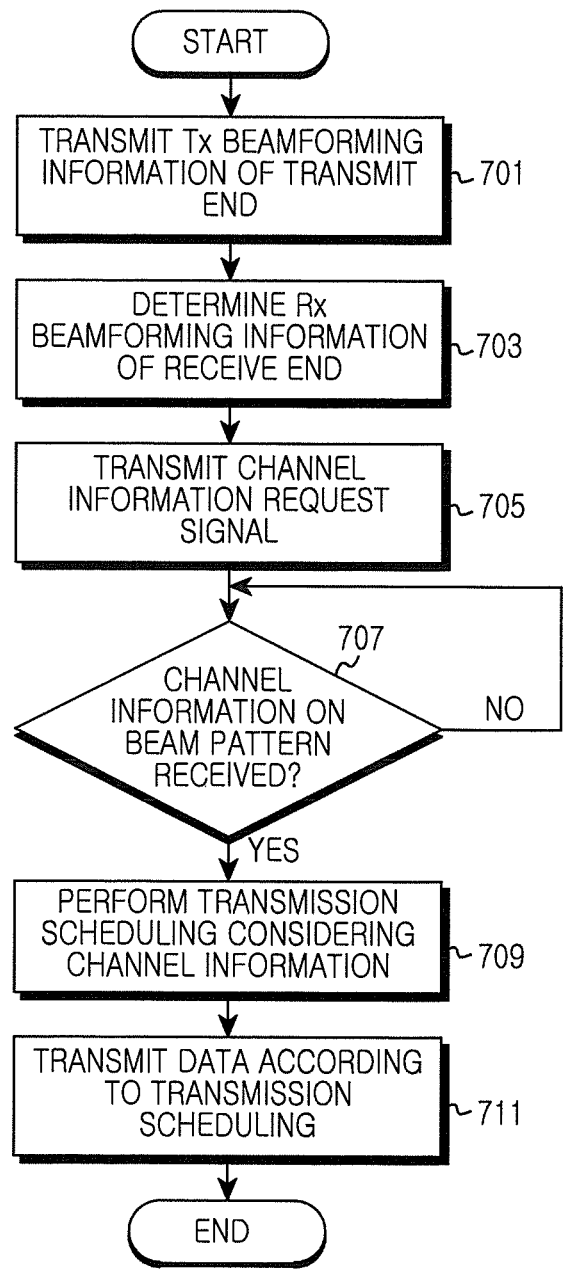
FIG. 7 illustrates a procedure for forming a beam in a transmit end according to an embodiment of the present disclosure.

FIG. 7 illustrates a procedure for forming a beam in a transmit end according to an embodiment of the present disclosure.

Referring to FIG. 7, in step 701, the transmit end transmits its own Tx beamforming information to a receive end. Here, the Tx beamforming information includes the number of Tx beam patterns supportable by the transmit end, Tx beam transmission timing and the like.

After that, the transmit end proceeds to step 703 and determines Rx beamforming capability information of a receive end. For example, upon network entry or handover of the receive end, the transmit end receives the Rx beamforming capability information of the receive end from the receive end in a capability negotiation process with the receive end. Here, the Rx beamforming capability information includes Rx beamforming support or non-support, the number of supportable Rx beam patterns, concurrent usability or non-usability of a plurality of Rx beams, information on the number of concurrently usable Rx beams, and the like. In an embodiment, the transmit end can determine Rx beamforming capability information constructed as in Table 1 above.

After determining the Rx beamforming capability information of the receive end, the transmit end proceeds to step 705 and requests for channel information on a Tx beam pattern supportable by itself. For example, the transmit end transmits a broadcasting signal for a request for channel information of a Tx beam pattern or a control message (e.g., REP_REQ) for the channel information request to the receive end. For another example, the transmit end allocates a resource for channel information transmission to the receive end. In an embodiment, the transmit end may transmit report form information for feeding back channel information to the receive end, together with the channel information request. Here, the report form information includes the number of Tx beam patterns to feed back channel information, a reference value to feed back the channel information, and the like.

Next, the transmit end proceeds to step 707 and determines if channel information on a Tx beam pattern is received from the receive end.

When it is determined in step 707 that the channel information on the Tx beam pattern is received from the receive end, the transmit end proceeds to step 709 and performs Tx scheduling considering the channel information on the Tx beam pattern provided from the receive end. For example, as illustrated in FIGS. 8A and 8B, the transmit end selects at least one Tx beam pattern for at least one Rx beam pattern to be used for transmitting a signal to the receive end in consideration of the channel information on the Tx beam pattern provided from the receive end.

After performing the Tx scheduling in step 709, the transmit end proceeds to step 711 and transmits a signal to the receive end according to Tx scheduling information. That is, the transmit end transmits the signal to the receive end through the Tx beam pattern selected through the Tx scheduling.

Next, the transmit end terminates the algorithm according to the embodiment of the present disclosure.

FIGS. 8A and 8B illustrate a scheduling procedure for diversity transmission in a transmit end according to an embodiment of the present disclosure.

Referring to FIGS. 8A and 8B, when the transmit end performs Tx scheduling in step 709 of FIG. 7, the transmit end proceeds to step 801 and determines Rx beamforming capability information of a receive end. For example, the transmit end determines the Rx beamforming capability information that is provided from the receive end in step 703. Here, the Rx beamforming capability information includes Rx beamforming support or non-support, the number of supportable Rx beam patterns, concurrent usability or non-usability of a plurality of Rx beams, information on the number of concurrently usable Rx beams, the number of usable MIMO streams, and the like.

After that, the transmit end proceeds to step 803 and determines if the receive end to receive a signal transmitted by the transmit end supports Rx beamforming according to the Rx beamforming capability information of the receive end. When it is determined in step 803 that the receive end supports the Rx beamforming, the transmit end proceeds to step 805 and determines if the receive end can concurrently receive a signal using a plurality of Rx beam patterns.

When it is determined in step 805 that the receive end can concurrently receive the signal using the plurality of Rx beam patterns, the transmit end proceeds to step 807 and determines if the transmit end concurrently can transmit the signal using a plurality of Tx beam patterns.

When it is determined in step 807 that the transmit end concurrently can transmit the signal using the plurality of Tx beam patterns, the transmit end proceeds to step 809 and determines if the receive end supports a multiple MIMO stream. For example, the transmit end determines if the receive end supports the multiple MIMO stream considering information of the number of usable MIMO streams included in the Rx beamforming capability information of the receive end.

When it is determined in step 809 that the receive end supports the multiple MIMO stream, the transmit end decides that it transmits a signal to the receive end using a spatial multiplexing transmission scheme. According to this, the transmit end proceeds to step 811 and selects a plurality of Rx beam patterns and a plurality of Tx beam patterns for spatial multiplexing transmission. For example, the transmit end determines channel information of Tx beam patterns for at least one Rx beam pattern supportable by the receive end provided from the receive end. After that, the transmit end selects a plurality of Tx beam patterns for a plurality of Rx beam patterns of good channel states among the channel information of the Tx beam patterns for the each Rx beam pattern.

Alternatively, when it is determined in step 809 that the receive end does not support the multiple MIMO stream, the transmit end decides that it transmits a signal to the receive end using a diversity transmission scheme. According to this, the transmit end proceeds to step 813 and selects a plurality of Tx beam patterns and a plurality of Rx beam patterns for diversity transmission. For example, the transmit end determines channel information of Tx beam patterns for at least one Rx beam pattern supportable by the receive end provided from the receive end. And then, the transmit end selects a plurality of Tx beam patterns for a plurality of Rx beam patterns having good channel states among the channel information of the Tx beam patterns for each Rx beam pattern.

Alternatively, when it is determined in step 807 that the transmit end concurrently cannot transmit the signal using the plurality of Tx beam patterns, the transmit end proceeds to step 815 and determines whether to provide diversity transmission through sequential transmission.

Alternatively, when it is determined in step 805 that the receive end cannot concurrently receive the signal using the plurality of Rx beam patterns, the transmit end proceeds to step 815 and determines whether to provide the diversity transmission through the sequential transmission.

When it is determined in step 815 that the transmit end provides the diversity transmission through the sequential transmission, the transmit end proceeds to step 817 and selects at least one Tx beam pattern and at least one Rx beam pattern for the diversity transmission. For example, the transmit end determines channel information of Tx beam patterns for at least one Rx beam pattern supportable by the receive end provided from the receive end. And then, the transmit end selects a plurality of Tx beam patterns to transmit the same signal at a different timing and a plurality of Rx beam patterns for receiving the same signal transmitted by the transmit end at a different timing. For another example, the transmit end may select one Tx beam pattern for one Rx beam pattern for transmitting the same information at a different timing.

Alternatively, when it is determined in step 815 that the transmit end does not provide the diversity transmission through the sequential transmission, the transmit end recognizes that it does not perform the diversity transmission. Accordingly, the transmit end proceeds to step 819 and selects any one Tx beam pattern to be used for transmitting a signal correspondingly to any one Rx beam pattern of the receive end to be transmitted by the transmit end, in consideration of channel information of Tx beam patterns for each Rx beam pattern.

Alternatively, when it is determined in step 803 that the receive end does not support the Rx beamforming, the transmit end proceeds to step 821 and determines whether it concurrently can transmit a signal using a plurality of Tx beam patterns.

When it is determined in step 821 that the transmit end concurrently can transmit the signal using the plurality of Tx beam patterns, the transmit end proceeds to step 823 and determines if the receive end supports a multiple MIMO stream. For example, the transmit end determines if the receive end supports the multiple MIMO stream in consideration of information of the number of usable MIMO streams included in the Rx beamforming capability information of the receive end.

When it is determined in step 823 that the receive end supports the multiple MIMO stream, the transmit end decides that it transmits a signal to the receive end using a spatial multiplexing transmission scheme. According to this, the transmit end proceeds to step 825 and selects a plurality of Tx beam patterns for spatial multiplexing transmission.

Alternatively, when it is determined in step 823 that the receive end does not support the multiple MIMO stream, the transmit end decides that it transmits a signal to the receive end using a diversity transmission scheme. According to this, the transmit end proceeds to step 827 and selects a plurality of Tx beam patterns for a plurality of Rx beam patterns for diversity transmission.

Alternatively, when it is determined in step 821 that the transmit end concurrently cannot transmit the signal using the plurality of Tx beam patterns, the transmit end proceeds to step 829 and determines whether to provide the diversity transmission through the sequential transmission.

When it is determined in step 829 that the transmit end provides the diversity transmission through the sequential transmission, the transmit end proceeds to step 831 and selects at least one Tx beam pattern for diversity transmission. For example, the transmit end determines channel information of Tx beam patterns provided from the receive end. After that, the transmit end selects a plurality of Tx beam patterns to transmit the same signal at a different timing, in consideration of the channel information of the Tx beam patterns. For another example, the transmit end selects one Tx beam pattern for transmitting the same information at a different timing, in consideration of the channel information of the Tx beam patterns.

Alternatively, when it is determined in step 829 that the transmit end does not provide the diversity transmission through the sequential transmission, the transmit end proceeds to step 833 and selects any one Tx beam pattern to be used for transmitting a signal considering the channel information of the Tx beam patterns provided from the receive end.

After that, the transmit end proceeds to step 711 of FIG. 7 and transmits a signal to the receive end through the Tx beam pattern selected through the transmission scheduling.

In the aforementioned exemplary embodiment, the transmit end performs transmission scheduling using channel information on a Tx beam pattern provided from the receive end.

In another exemplary embodiment, the transmit end may transmit a signal considering a Tx beam pattern or Tx/Rx beam pattern selected in the receive end. That is, as illustrated in FIGS. 8A and 8B, the receive end can perform transmission scheduling for signal transmission of the transmit end.

As described above, the transmit end selects any one of a spatial multiplexing transmission scheme and a diversity transmission scheme considering a beam management capability of the transmit end, a beam management capability of the receive end, and a MIMO stream management capability of the receive end. For example, the transmit end estimates information of a channel correlation between Tx beam patterns or a channel correlation between Tx/Rx beam pattern combinations considering the beam management capability of the transmit end, the beam management capability of the receive end, and the MIMO stream management capability of the receive end. After that, the transmit end selects any one of the spatial multiplexing transmission scheme and the diversity transmission scheme considering the information of the channel correlation between the Tx beam patterns or the channel correlation between the Tx/Rx beam pattern combinations. For another example, the transmit end estimates a gain for each multiple antenna transmission scheme considering the beam management capability of the transmit end, the beam management capability of the receive end, and the MIMO stream management capability of the receive end. After that, the transmit end may select any one of the spatial multiplexing transmission scheme and the diversity transmission scheme considering the gain for each multiple antenna transmission scheme.

The following description is made for a technology for managing a Tx/Rx beam according to uplink multiple antenna transmission.

Figure 9:
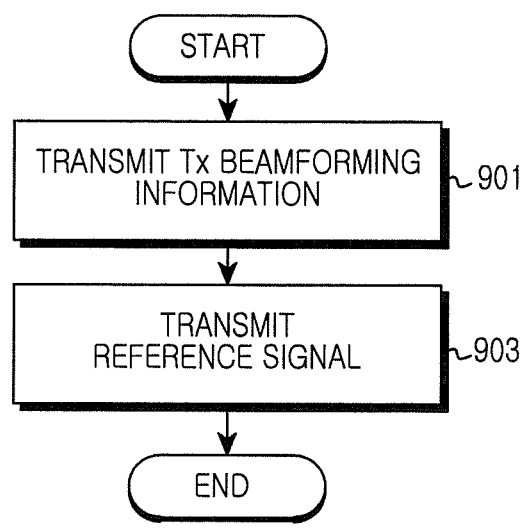
FIG. 9 illustrates a procedure for transmitting Tx beamforming information in a receive end according to an embodiment of the present disclosure.

FIG. 9 illustrates a procedure for transmitting Tx beamforming information in a receive end according to an exemplary embodiment of the present invention.

Referring to FIG. 9, in step 901, the receive end transmits its own Tx beamforming capability information to a transmit end. For example, upon network entry or handover, the receive end transmits its own Tx beamforming capability information to the transmit end in a capability negotiation process with the transmit end. Here, the Tx beamforming capability information includes Tx beamforming support or non-support, the number of supportable Tx beam patterns, concurrent usability or non-usability of a plurality of Tx beams, information on the number of concurrently usable Tx beams, the number of usable MIMO streams, and the like. In an exemplary embodiment, the receive end can construct the Tx beamforming capability information as in Table 2 below.

TABLE 2

| | |
|---|---|
| Capability to support Tx Beamforming | 0b0: non-support |
| | 0b1: support |
| Max number of Tx Beamforming patterns | 0b00: 1~0b111: 8 patterns |
| Capability of UL MIMO support | 0b0: non-support |
| | 0b1: support |
| Max number of UL MIMO streams | 0b000: 1 stream~0b111: 8 streams |
| Capability of MS transmitting concurrently with different Tx Beamforming patterns | 0b0: non-support |
| | 0b1: support |
| Number of MS Tx Beamforming patterns supported simultaneously (Number of MS TX Chains) | 0b00: 1~0b11: 4 |

Here, the number of Tx beams concurrently usable in the receive end can be expressed as the number of Tx RF chains of the receive end.

After that, the receive end proceeds to step 903 and transmits a reference signal through each Tx beam pattern.

Next, the receive end terminates the algorithm according to the present invention.

Although not illustrated, after transmitting the reference signal, the receive end transmits a signal to the transmit end according to reception scheduling information provided from the transmit end.

Figure 10:
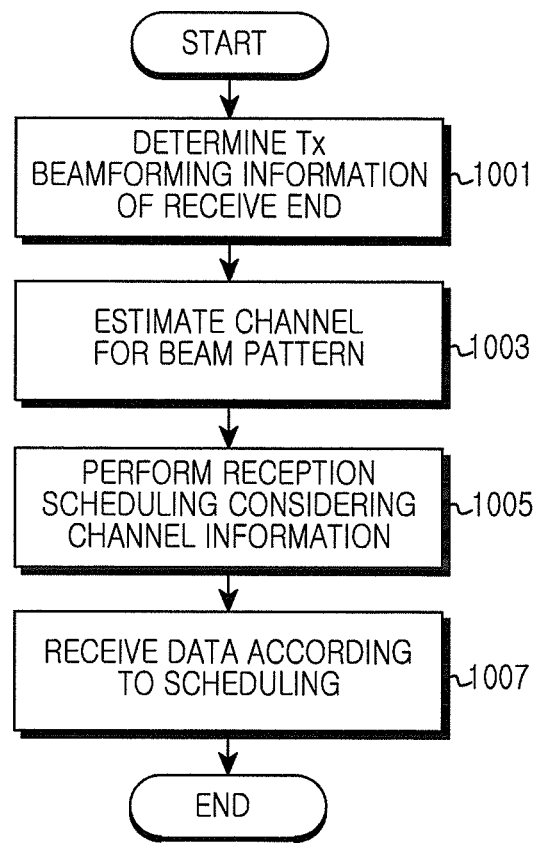
FIG. 10 illustrates a procedure for forming an Rx beam in a transmit end according to an embodiment of the present disclosure.

FIG. 10 illustrates a procedure for forming an Rx beam in a transmit end according to an exemplary embodiment of the present invention.

Referring to FIG. 10, in step 1001, the transmit end determines Tx beamforming capability information of a receive end. For example, upon network entry or handover of the receive end, the transmit end receives the Tx beamforming capability information of the receive end from the receive end in a capability negotiation process with the receive end. Here, the Tx beamforming capability information includes Tx beamforming support or non-support, the number of supportable Tx beam patterns, concurrent usability or non-usability of a plurality of Tx beams, information on the number of concurrently usable Tx beams, the number of usable MIMO streams, and the like. In an exemplary embodiment, the transmit end can determine Tx beamforming capability information of the receive end constructed as in Table 2 above.

After determining the Tx beamforming capability information of the receive end in step 1001, the transmit end proceeds to step 1003 and estimates a channel for each supportable Tx beam pattern of the receive end. For example, the transmit end estimates a channel for each Tx beam pattern using a reference signal that the receive end transmits through each Tx beam pattern. If the transmit end supports Rx beamforming, the transmit end estimates channel information on a Tx beam pattern of the receive end by each Rx beam pattern.

Figure 11:
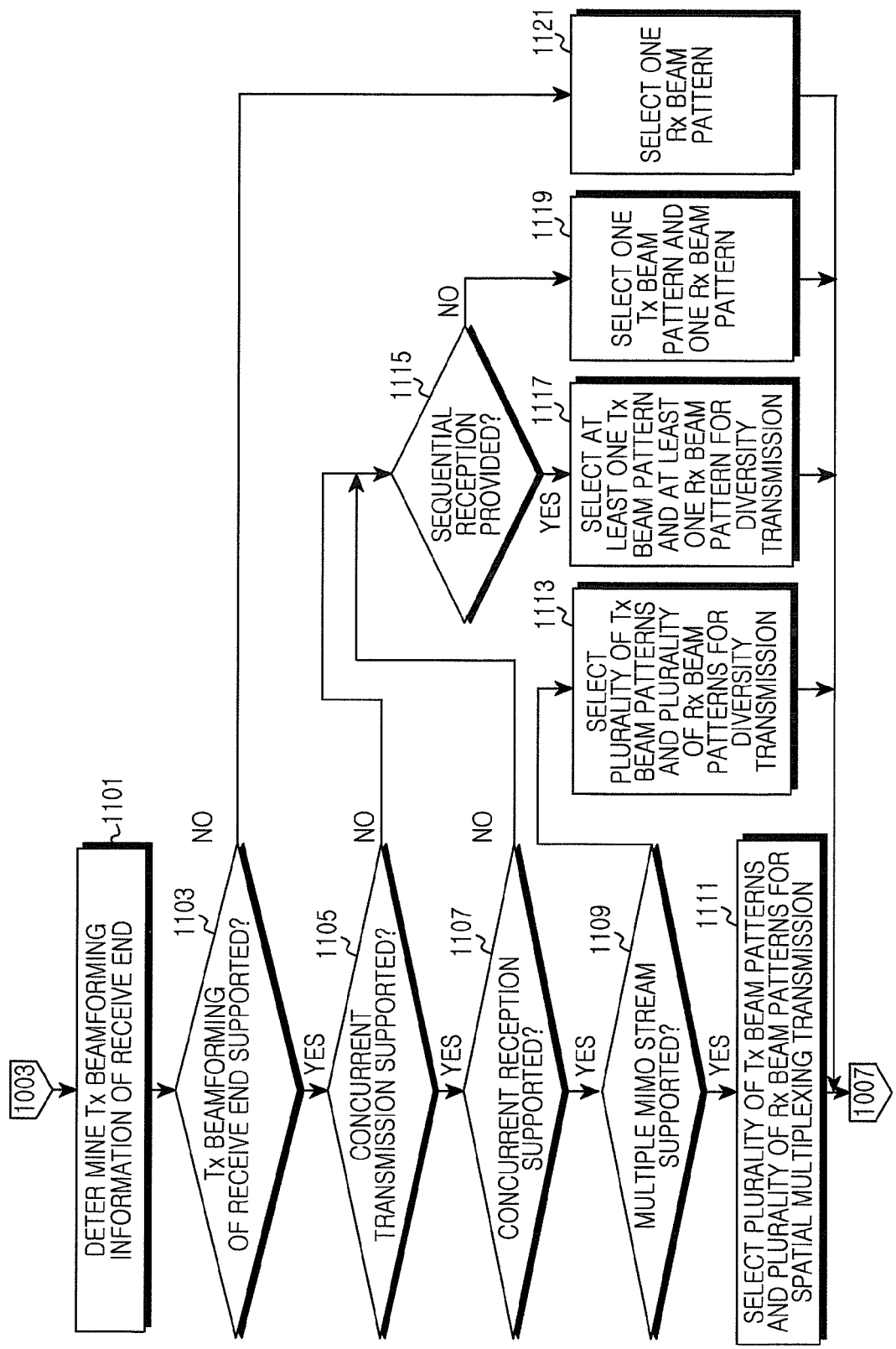
FIG. 11 illustrates a scheduling procedure for uplink beamforming in a transmit end according to an embodiment of the present disclosure.

After determining the channel information on the Tx beam pattern of the receive end in step 1003, the transmit end proceeds to step 1005 and performs reception scheduling considering the channel information on the Tx beam pattern of the receive end. For example, as illustrated in FIG. 11, the transmit end selects at least one Tx beam pattern for at least one Rx beam pattern to be used for receiving a signal from the receive end considering the channel information on the Tx beam pattern of the receive end. In an exemplary embodiment, the transmit end transmits reception scheduling information to the receive end.

After performing the reception scheduling in step 1005, the transmit end proceeds to step 1007 and receives a signal from the receive end according to the reception scheduling information. That is, the transmit end receives the signal from the receive end through the Rx beam pattern selected through the reception scheduling.

Next, the transmit end terminates the algorithm according to the present invention.

FIG. 11 illustrates a scheduling procedure for uplink beamforming in a transmit end according to an exemplary embodiment of the present invention.

Referring to FIG. 11, when the transmit end performs reception scheduling in step 1005 of FIG. 10, the transmit end proceeds to step 1101 and determines Tx beamforming capability information of a receive end. For example, in step 1101, the transmit end determines the Tx beamforming capability information of the receive end provided from the receive end. Here, the Tx beamforming capability information includes Tx beamforming support or non-support, the number of supportable Tx beam patterns, concurrent usability or non-usability of a plurality of Tx beams, information on the number of concurrently usable Tx beams, the number of usable MIMO streams, and the like.

After that, the transmit end proceeds to step 1103 and determines if the receive end supports Tx beamforming according to the Tx beamforming capability information of the receive end.

When it is determined in step 1103 that the receive end supports the Tx beamforming, the transmit end proceeds to step 1105 and determines if the receive end concurrently can transmit a signal using a plurality of Tx beam patterns.

When it is determined in step 1105 that the receive end concurrently can transmit the signal using the plurality of Tx beam patterns, the transmit end proceeds to step 1107 and determines if the transmit end can concurrently receive the signal using a plurality of Rx beam patterns.

When it is determined in step 1107 that the transmit end concurrently can receive the signal using the plurality of Rx beam patterns, the transmit end proceeds to step 1109 and determines if the receive end supports a multiple MIMO stream. For example, the transmit end determines if the receive end supports the multiple MIMO stream considering information of the number of usable MIMO streams included in the Tx beamforming capability information of the receive end.

When it is determined in step 1109 that the receive end supports the multiple MIMO stream, the transmit end decides that it receives a signal from the receive end using a spatial multiplexing transmission scheme. According to this, the transmit end proceeds to step 1111 and selects a plurality of Rx beam patterns and a plurality of Tx beam pattern for spatial multiplexing transmission. For example, the transmit end determines channel information of Rx beam patterns for at least one Tx beam pattern supportable by the receive end provided from the receive end. After that, the transmit end selects a plurality of Rx beam patterns for a plurality of Tx beam patterns of good channel states among the channel information of the Rx beam patterns for the each Tx beam pattern.

Alternatively, when it is determined in step 1109 that the receive end does not support the multiple MIMO stream, the transmit end decides that it receives a signal from the receive end using a diversity transmission scheme. According to this, the transmit end proceeds to step 1113 and selects a plurality of Rx beam patterns and a plurality of Tx beam patterns for diversity transmission. For example, the transmit end determines channel information of Rx beam patterns for at least one Tx beam pattern supportable by the receive end provided from the receive end. After that, the transmit end selects a plurality of Rx beam patterns for a plurality of Tx beam patterns of good channel states among the channel information of the Rx beam patterns for the each Tx beam pattern.

Alternatively, when it is determined in step 1107 that the transmit end concurrently cannot receive the signal using the plurality of Rx beam patterns, the transmit end proceeds to step 1115 and determines whether to provide diversity transmission through sequential reception.

Alternatively, when it is determined in step 1105 that the receive end concurrently cannot transmit the signal using the plurality of Tx beam patterns, the transmit end proceeds to step 1115 and determines whether to provide the diversity transmission through the sequential reception.

When it is determined in step 1115 that the receive end provides the diversity transmission through the sequential reception, the transmit end proceeds to step 1117 and selects at least one Rx beam pattern and at least one Tx beam pattern for the diversity transmission. For example, the transmit end determines channel information of Rx beam patterns for at least one Tx beam pattern supportable by the receive end provided from the receive end. After that, the transmit end selects a plurality of Tx beam patterns to transmit the same signal at a different timing in the receive end and a plurality of Rx beam patterns to receive the same signal transmitted by the receive end at a different timing. For another example, the transmit end may select one Tx beam pattern for one Rx beam pattern for transmitting the same information at a different timing in the receive end.

Alternatively, when it is determined in step 1115 that the receive end does not provide the diversity transmission through the sequential reception, the transmit end recognizes that it does not perform the diversity transmission. According to this, the transmit end proceeds to step 1119 and selects a Tx beam pattern of the receive end to transmit a signal and an Rx beam pattern of the transmit end to receive a signal, in consideration of the channel information of the Tx beam patterns for the each Rx beam pattern.

Alternatively, when it is determined in step 1103 that the receive end does not support the Tx beamforming, the transmit end proceeds to step 1121 and selects any one Rx beam pattern for receiving a signal from the receive end.

After that, the transmit end proceeds to step 1007 of FIG. 10 and receives a signal from the receive end through the Rx beam pattern selected through the reception scheduling. In an exemplary embodiment, the transmit end transmits reception scheduling information of FIG. 10 to the receive end in order to receive a signal from the receive end.

As described above, exemplary embodiments of the present disclosure have an advantage of being capable of increasing a transmission rate dependent on beamforming, and having robustness against a change of channel environment caused by an obstacle or channel fading through beamforming while being capable of obtaining a diversity gain, by supporting a multiple antenna transmission scheme in a wireless communication system using a beamforming technology.

While the disclosure has been shown and described with reference to certain preferred embodiments thereof, it will be understood by those skilled in the art that various changes in form and details may be made therein without departing from the spirit and scope of the disclosure as defined by the appended claims.

What is claimed is:

1. A method for operating a transmit end of a wireless communication system, the method comprising:
    determining at least one transmit (Tx) beam pattern based on receive (Rx) beamforming capability information of a receive end and channel information between the transmit end and the receive end; and
    transmitting a signal to the receive end using the at least one Tx beam pattern,
    wherein the Rx beamforming capability information comprises at least one of: Rx beamforming support or non-support of a receive end, a number of Rx beam patterns supportable by the receive end, concurrent usability or non-usability of a plurality of Rx beams, a number of Rx beams concurrently usable by the receive end, and a number of multiple antenna streams usable by the receive end.

2. The method of claim 1, further comprising:
    upon network entry or network re-entry of the receive end, receiving the Rx beamforming capability information from the receive end.

3. The method of claim 1, further comprising:
    sending a channel information request to the receive end; and
    receiving the channel information from the receive end.

4. The method of claim 3, wherein sending the channel information request comprises transmitting type information for feeding back channel information of the receive end, to the receive end.

5. The method of claim 4, wherein the type information comprises at least one of: a number of Tx beam patterns to feed back channel information, a number of Rx beam patterns to feed back the channel information, a number of Tx beam patterns by Rx beam to feed back the channel information, and a reference value for beam selection and channel information feedback, and
    wherein the reference value comprises at least one of: an absolute value of a channel quality, a relative value of the channel quality for reference beam combination, a time variance of a beam combination channel quality and a standard deviation of the beam combination channel quality, and a correlation value between beam combinations.

6. The method of claim 3, wherein receiving the channel information comprises, when the receive end supports Rx beamforming, receiving channel information on at least one Tx beam pattern for each Rx beam pattern supportable by the receive end.

7. The method of claim 1, wherein determining the at least one Tx beam pattern comprises, when the receive end supports Rx beamforming, concurrently receives a signal using a plurality of Rx beam patterns, and comprises a multiple antenna stream, selecting a plurality of Tx beam patterns and the plurality of Rx beam patterns for a multiple antenna transmission scheme.

8. The method of claim 7, further comprising, before selecting the Tx beam patterns and the Rx beam patterns, selecting any one of a spatial multiplexing transmission scheme and a diversity transmission scheme considering at least one of the Rx beamforming capability information, and Tx beam management information of the transmit end,
    wherein selecting the Tx beam patterns and the Rx beam patterns comprises selecting a plurality of Tx beam patterns and a plurality of Rx beam patterns for a multiple antenna transmission scheme of any one of the spatial multiplexing transmission scheme and the diversity transmission scheme.

9. The method of claim 1, wherein determining the at least one Tx beam pattern comprises, when the receive end supports Rx beamforming and concurrently does not receive a signal using a plurality of Rx beam patterns and the transmit end sequentially transmits a signal, selecting at least one Tx beam pattern and at least one Rx beam pattern.

10. The method of claim 1, wherein determining the at least one Tx beam pattern comprises, when the receive end does not support Rx beamforming and comprises a multiple antenna stream, selecting a plurality of Tx beam patterns.

11. The method of claim 1, wherein determining the at least one Tx beam pattern comprises, when the receive end does not support Rx beamforming and the transmit end sequentially transmits a signal, selecting the at least one Tx beam pattern.

12. An apparatus in a transmit end of a wireless communication system, the apparatus comprising:
a beam setting unit configured to determine at least one transmit (Tx) beam pattern based on the receive (Rx) beamforming capability information of a receive end and channel information between the transmit end and the receive end; and
a transmitter configured to transmit a signal to the receive end using the at least one Tx beam pattern,
wherein the Rx beamforming capability information comprises at least one of: Rx beamforming support or non-support of a receive end, a number of Rx beam patterns supportable by the receive end, concurrent usability or non-usability of a plurality of Rx beams, a number of Rx beams concurrently usable by the receive end, and a number of multiple antenna streams usable by the receive end.

13. The apparatus of claim 12, wherein the transmitter is configured to send a channel information request to the receive end.

14. The apparatus of claim 13, wherein the transmitter is configured to transmit type information for feeding back channel information of the receive end, to the receive end.

15. The apparatus of claim 14, wherein the type information comprises at least one of: a number of Tx beam patterns to feed back channel information, a number of Rx beam patterns to feed back the channel information, a number of Tx beam patterns by Rx beam to feed back the channel information, and a reference value for beam selection and channel information feedback, and
wherein the reference value comprises at least one of: an absolute value of a channel quality, a relative value of the channel quality for reference beam combination, a time variance of a beam combination channel quality and a standard deviation of the beam combination channel quality, and a correlation value between beam combinations.

16. The apparatus of claim 12, further comprising a receiver configured to receive the RX beamforming capability information from the receive end, upon network entry or network re-entry of the receive end.

17. The apparatus of claim 16, wherein, when the receive end supports Rx beamforming, the receiver is configured to receive the channel information on the at least one Tx beam pattern for each Rx beam pattern supportable by the receive end.

18. The apparatus of claim 16, wherein, when the receive end supports Rx beamforming, concurrently receives a signal using a plurality of Rx beam patterns, and comprises a multiple antenna stream, the beam setting unit is configured to select a plurality of Tx beam patterns and the plurality of Rx beam patterns for a multiple antenna transmission scheme.

19. The apparatus of claim 12, wherein the beam setting unit is configured to select any one of a spatial multiplexing transmission scheme and a diversity transmission scheme considering at least one of the Rx beamforming capability information, and Tx beam management information of the transmit end, and selects a plurality of Tx beam patterns and a plurality of Rx beam patterns for a multiple antenna transmission scheme of any one of the spatial multiplexing transmission scheme and the diversity transmission scheme.

20. The apparatus of claim 12, wherein, when the receive end supports Rx beamforming and concurrently does not receive a signal using a plurality of Rx beam patterns and the transmit end sequentially transmits a signal, the beam setting unit is configured to select at least one Tx beam pattern and at least one Rx beam pattern.

21. The apparatus of claim 12, wherein, when the receive end does not support Rx beamforming and comprises a multiple antenna stream, the beam setting unit is configured to select a plurality of Tx beam patterns.

22. The apparatus of claim 12, wherein, when the receive end does not support Rx beamforming and the transmit end sequentially transmits a signal, the beam setting unit is configured to select at least one Tx beam pattern.

* * * * *